W. MAXWELL & J. M. ALLEN.
FERTILIZER DISTRIBUTER.
APPLICATION FILED JULY 17, 1911.
1,036,668.
Patented Aug. 27, 1912.
2 SHEETS—SHEET 1.
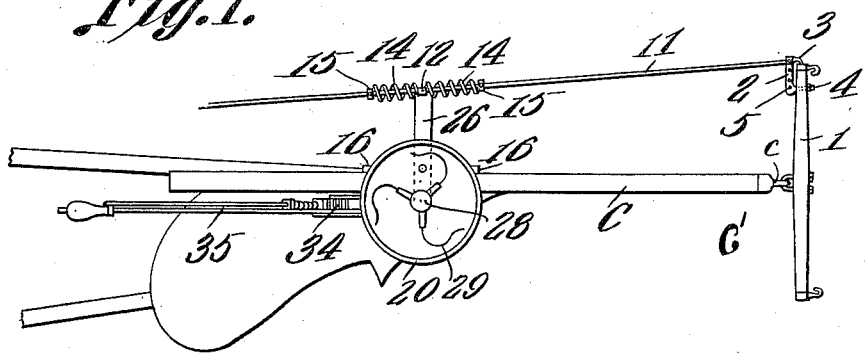
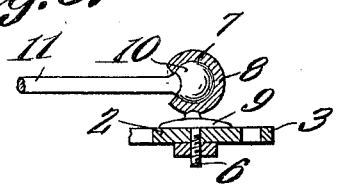
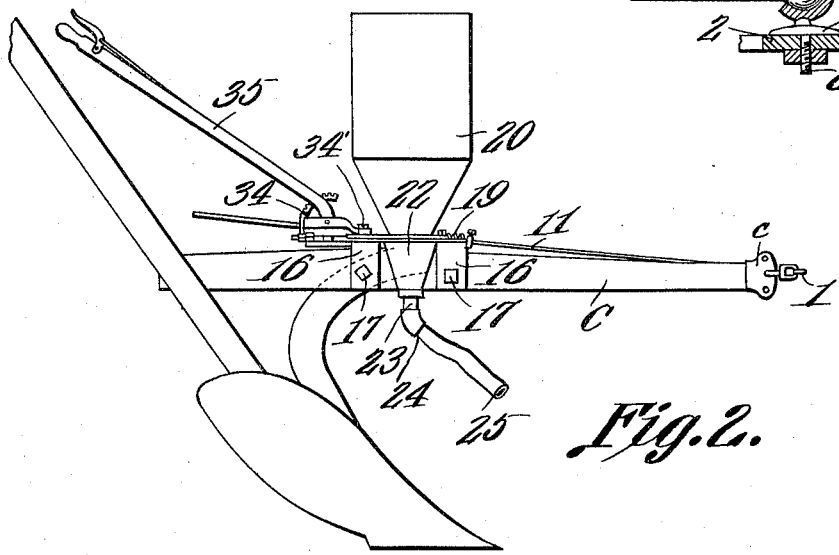
Wes Maxwell and
J. Melvin Allen,
Inventors

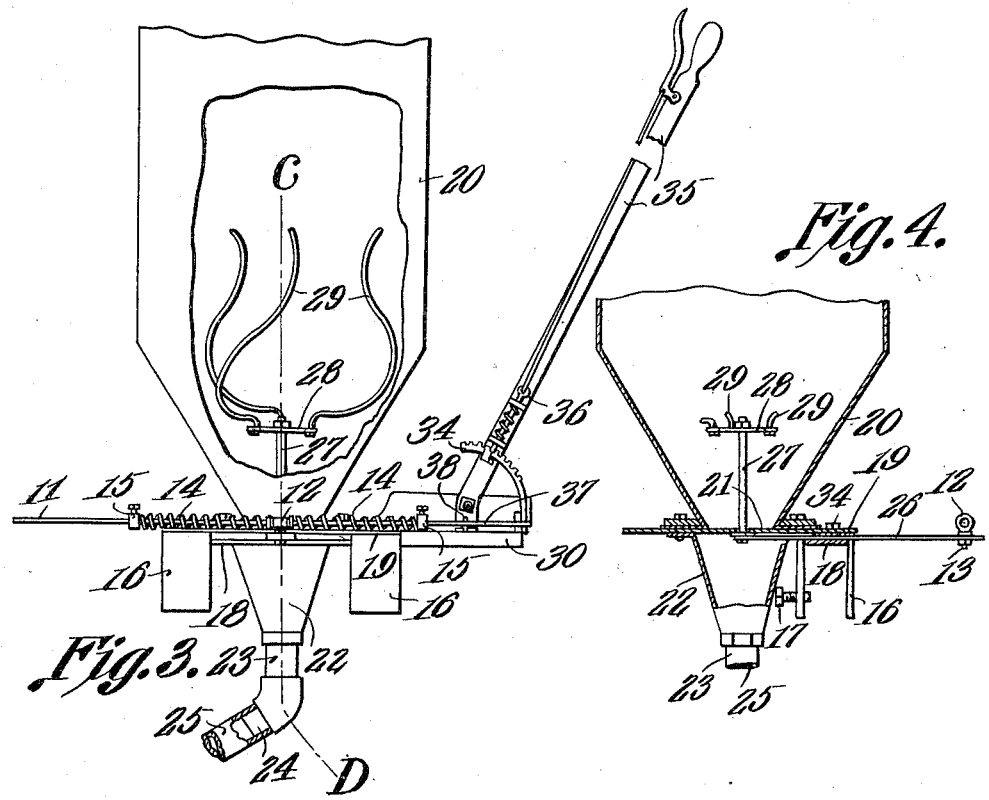

UNITED STATES PATENT OFFICE.

WES MAXWELL AND JOHN MELVIN ALLEN, OF HOPE, ARKANSAS.

FERTILIZER-DISTRIBUTER.

1,036,668. Specification of Letters Patent. Patented Aug. 27, 1912.

Application filed July 17, 1911. Serial No. 639,025.

*To all whom it may concern:*

Be it known that we, WES MAXWELL and JOHN MELVIN ALLEN, citizens of the United States, residing at Hope, in the county of Hempstead, State of Arkansas, have invented a new and useful Fertilizer-Distributer, of which the following is a specification.

This invention relates to fertilizer distributers and its principal object is to provide a device of this character in the form of an attachment adapted to be placed upon the beam of a plow and which includes agitating means operated by the draft animal and whereby the contents of the distributer will be caused to flow freely.

Another object is to provide improved means whereby power may be transmitted from the draft animal to the agitating means.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the acompanying drawings the preferred form of the invention has been shown.

In said drawings:—Figure 1 is a plan view of the attachment in position upon a plow beam. Fig. 2 is a side elevation thereof. Fig. 3 is an enlarged view in elevation of a portion of the attachment, the same being viewed from the side opposite to that shown in Fig. 2, parts being broken away. Fig. 4 is a vertical transverse section through the attachment, said section being taken on the line C—D Fig. 3. Fig. 5 is a plan view of a portion of the bottom of the hopper and showing the outlet opening. Fig. 6 is a plan view of the cut-off slide and its guide. Fig. 7 is a transverse section on the line A—B Fig. 6. Fig. 8 is a perspective view of the lower end portion of the slide controlling lever. Fig. 9 is a view partly in section and partly in elevation of a portion of the actuating rod and its connection with the swingle tree.

Referring to the figures by characters of reference C designates the beam of a plow of any suitable type, the same having a clevis $c$ at the front end thereof adapted to be engaged by a U-bolt $c'$ extending from the middle portion of a swingle tree 1. A plate 2 is arranged longitudinally along the back-portion of the swingle tree adjacent one end and has a hooked extension 3 engaging one end of the swingle tree and a bolt-like extension 4 which extends through and is fastened to the swingle tree. This plate has a series of openings 5 therein any one of which is adapted to receive a bolt 6 Fig. 9 having a head 7 formed with a socket 8, there being a flange 9 close to the head and which bears upon plate 2. A ball 10 is seated within the socket 8 and is formed at one end of a rod 11 which extends rearwardly from the swingle tree and is mounted to slide within a sleeve 12 formed at the upper end of a bolt 13. Cushioning springs or buffers 14 are mounted on the rod at opposite sides of the sleeve 12 and bear against said sleeve and also against collars 15 which are adjustably mounted on the rod.

Inverted yokes 16 are adapted to be secured to the beam C by means of set screws 17. These yokes are connected by a plate 18 extending thereinto and another plate 19 is secured upon the yokes and extends laterally therebeyond, this last mentioned plate constituting the base on which is mounted a hopper 20 for holding fertilizer. Said plate constitutes the bottom of the hopper and has a slot 21 located directly over a discharge spout 22 which is secured to the lower surface of the plate 19 and extends downwardly therefrom. As shown in the drawings this spout is preferably frusto-conical and has a tubular extension 23 terminating in a nipple 24 which is extended at an angle to the spout. A flexible outlet tube 25 is secured upon the nipple in any desired manner.

A lever 26 is fulcrumed on the plate 18 and extends laterally beyond the hopper and is engaged, at its outer end, by the bolt 13 hereinbefore described. The other end of the lever is located under the slot 21 and has a stem 27 extending upwardly therefrom and through the slot. Arms 28 are extended from the upper end of the stem 27 and curved spring fingers 29 extend upwardly from these arms and are for the purpose of thoroughly agitating the contents of the hopper as will be hereinafter set forth.

A channeled guide plate 30 is extended into the upper portion of the spout 22 and under plate 19, this plate being preferably parallel with the plate 18. A cut-off slide 31 is mounted to reciprocate upon the guide plate and has a notch 32 in one end thereof, said end being movable under the slot 21 so as to partly or entirely close it. A slot 33 is formed longitudinally within the slide 31 and receives a guide bolt 34' which also constitutes means for fastening to the plate 19, a toothed segment 34. A lever 35 is fulcrumed upon the segment and has a spring pressed dog 36 which normally engages said segment so as to hold the lever against swinging movement. A slotted foot 37 is formed at the lower end of the lever and extends laterally therefrom, said foot loosely engaging a pin 38 which projects upwardly from the slide 31.

As hereinbefore stated, the present improvements constitute, in themselves, a complete article adapted to be applied to the beam of a plow of any type, the swingle tree being substituted for the usual tree employed. The hopper is secured upon the beam C by means of the yokes 16 and set screws 17. The swingle tree 1 is held at right angles to the beam and rod 11 is adjusted within sleeve 12 so as to enable the lever 26 to lie parallel with the swingle tree. When hopper 20 is filled with a fertilizer and the plow is pulled forward, the oscillation of the swingle tree will cause rod 11 to reciprocate and said rod will, in turn, oscillate the lever 26. Stem 27 will therefore be shifted back and forth within the slot 21 and the spring fingers 29 will thoroughly agitate the contents of the hopper, causing them to flow freely through the slot and into the spout 22. This stem does not rotate but merely moves with the end of lever 26. The size of the outlet opening can be varied by manipulating lever 35 so as to cause the slide 31 to move under the slot. By shifting this slide a sufficient distance, the outlet opening can be entirely closed, stem 27, at this time, being extended between one end wall of the slot and the notched end of the slide. The springs 14 constitute cushions whereby injury to lever 26 and the parts operated thereby is prevented should the rod 11 be pulled or pushed too suddenly. By providing the flexible discharge tube 25, the fertilizer will not only be discharged onto the ground in advance of the plow share but, should said tube strike an unyielding obstruction, it will bend out of the way without causing any of the parts of the attachment to become injured.

By providing the apertured plate 2, the throw of the rod 11 can be varied because it is thus possible to connect the rod to the swingle tree at any desired distance from the center thereof. The ball and socket connection between the rod and the whiffletree permits said whiffletree to swing upwardly or downwardly without bending the rod.

What is claimed is:—

1. The combination with a supporting structure, of a hopper, an element movably mounted therein, a whiffletree connected to said structure, and cushioned means operated by the whiffletree for actuating said element.

2. An attachment for plows and the like, comprising a hopper, means for detachably securing the same to a beam, a lever fulcrumed adjacent the hopper, an upstanding stem fixedly connected to the lever and extending into the hopper, a flexible agitating device thereon, a whiffletree for attachment to a clevis, and a cushioned connection between the whiffletree and lever.

3. An attachment for plows and the like, including a hopper, means for detachably securing the same to a beam, a lever mounted to swing in a substantially horizontal plane, an agitating device carried thereby and extending into the hopper, said device including resilient fingers, a whiffletree, and an adjustable connection between the whiffletree and the lever for oscillating said device about the fulcrum of the lever.

4. An attachment for plows and the like, including a hopper, means for detachably securing the same to a beam, there being an opening in the bottom of the hopper, a spout for receiving material from the opening, a movable element extending under the hopper, an agitating device carried thereby and projecting into the hopper and through said opening, a whiffletree, a connection between the whiffletree and said element for transmitting motion to said element from the whiffletree to oscillate the agitating device about a substantially vertical axis, and means under the control of the operator for regulating the size of the opening within the hopper.

5. An attachment for plows and the like, including a hopper having an outlet opening, a spout supported under said opening, a flexible discharge tube connected to the spout, a movable element extending between the spout and hopper, an agitating device carried by said element and projecting into the hopper through said opening, a whiffletree, cushioned power transmitting means connecting the whiffletree and said element, and a cut-off device for regulating the size of the discharge opening.

6. In a fertilizer distributer, a hopper having an opening in the bottom thereof, a stem projecting through the opening and into the hopper, curved spring fingers upon the stem, and means for actuating the stem to shift the fingers.

In testimony that we claim the foregoing as our own, we have hereto affixed our signatures in the presence of two witnesses.

WES MAXWELL.
J. MELVIN ALLEN.

Witnesses:
GUS PARKER,
FRED RICHARDS.

Copies of this patent may be obtained for five cents each, by addressing the "Commissioner of Patents, Washington, D. C."